W. Y. MOFFAT.
SLACK ADJUSTER.
APPLICATION FILED FEB. 8, 1912.

1,060,482.

Patented Apr. 29, 1913.

2 SHEETS—SHEET 1.

Witnesses
C. H. Wagner,
J. F. Brennan

Inventor
William Y. Moffat
By Robb & Robb
Attorneys.

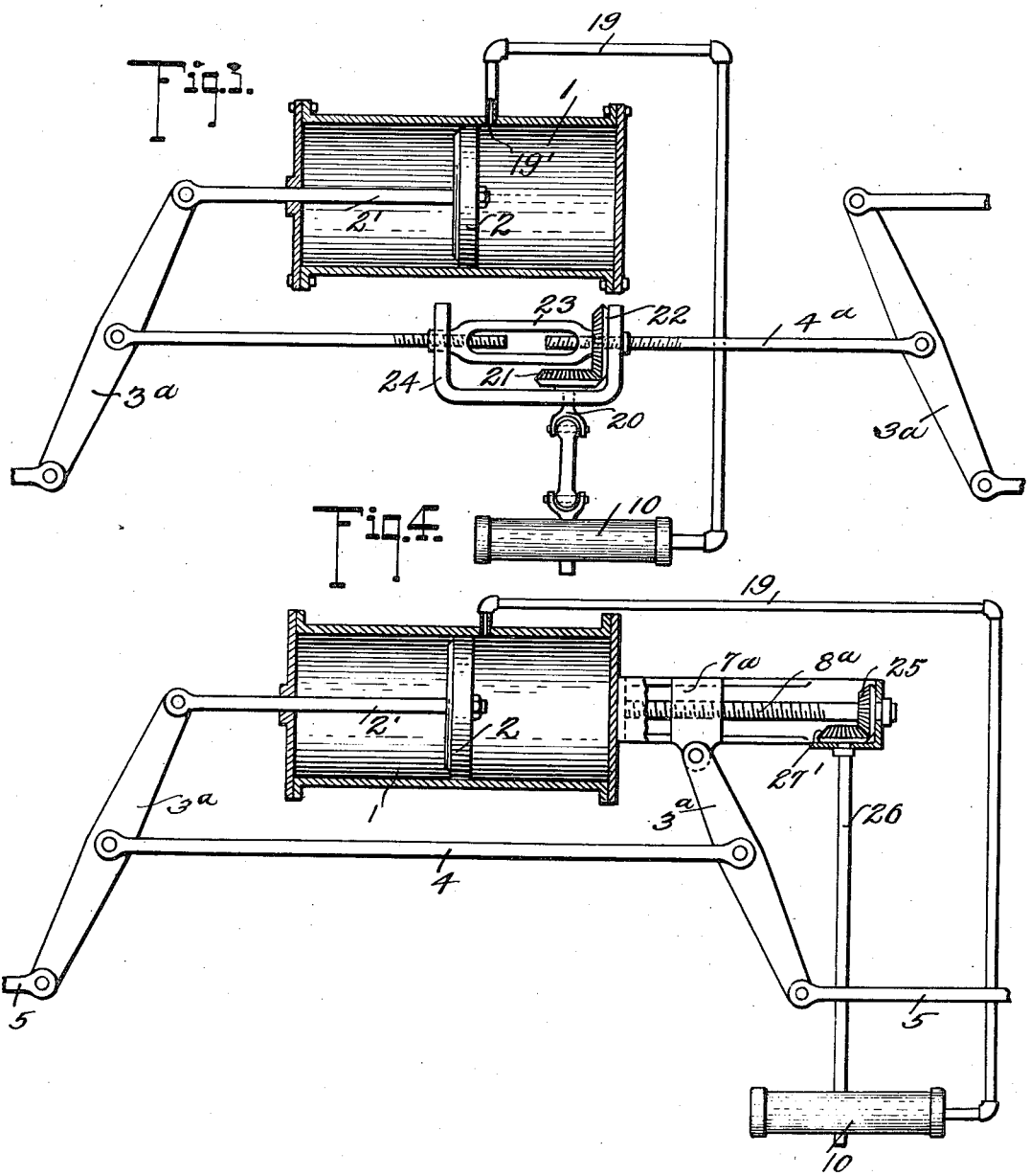

UNITED STATES PATENT OFFICE.

WILLIAM Y. MOFFAT, OF DUNMORE, PENNSYLVANIA, ASSIGNOR OF ONE-FOURTH TO ALEXANDER F. TRIMBLE, OF SCRANTON, PENNSYLVANIA.

SLACK-ADJUSTER.

1,060,482.

Specification of Letters Patent.   Patented Apr. 29, 1913.

Application filed February 8, 1912.   Serial No. 676,452.

*To all whom it may concern:*

Be it known that I, WILLIAM Y. MOFFAT, a citizen of the United States, residing at Dunmore, in the county of Lackawanna and State of Pennsylvania, have invented new and useful Improvements in Slack-Adjusters, of which the following is a specification.

The present invention appertains to slack adjusters for taking up slack in connections of brake rigging of railway rolling stock, such as incidental to the wear of the brake shoes, this invention being a disclosure of new embodiments of certain mechanism presented in my previous application Serial Number 644,037 filed August 14th, 1911.

My invention comprehends primarily a very simple and practical form of slack adjusting device which is susceptible of application to brake systems of different types and which utilize the customarily employed brake cylinder, brake levers, and associated connections. The adjusting device aforesaid consists essentially of an auxiliary cylinder capable of being supplied with a pressure medium from the brake cylinder, a special form of piston being arranged in the auxiliary cylinder and having a rack extending therefrom for coöperation with gear and ratchet devices, by which motion of the piston is transmitted from the piston to a suitable take-up device co-acting directly with a brake lever or levers, as the case may be.

Figure 1:
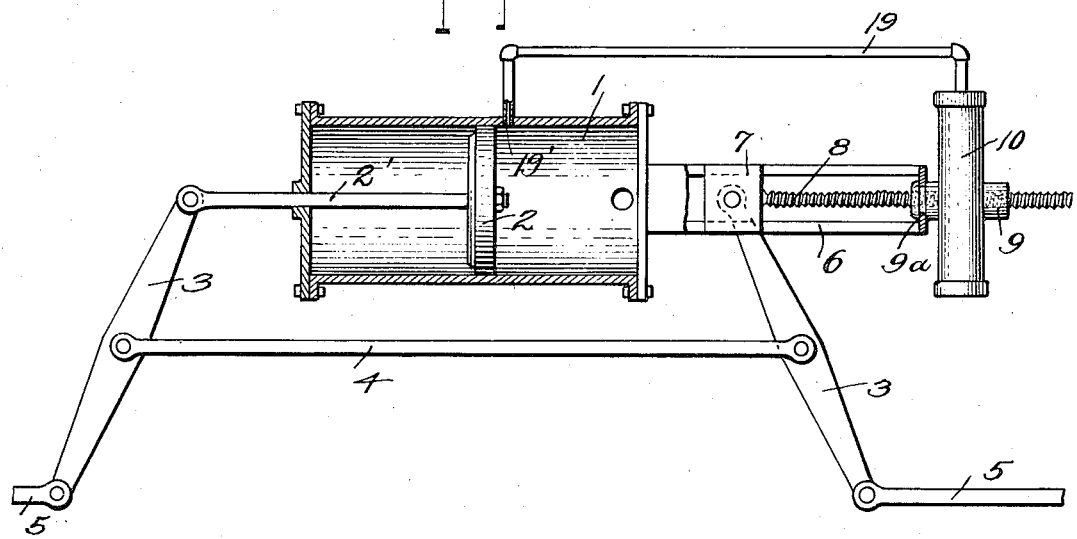
Figure 2:
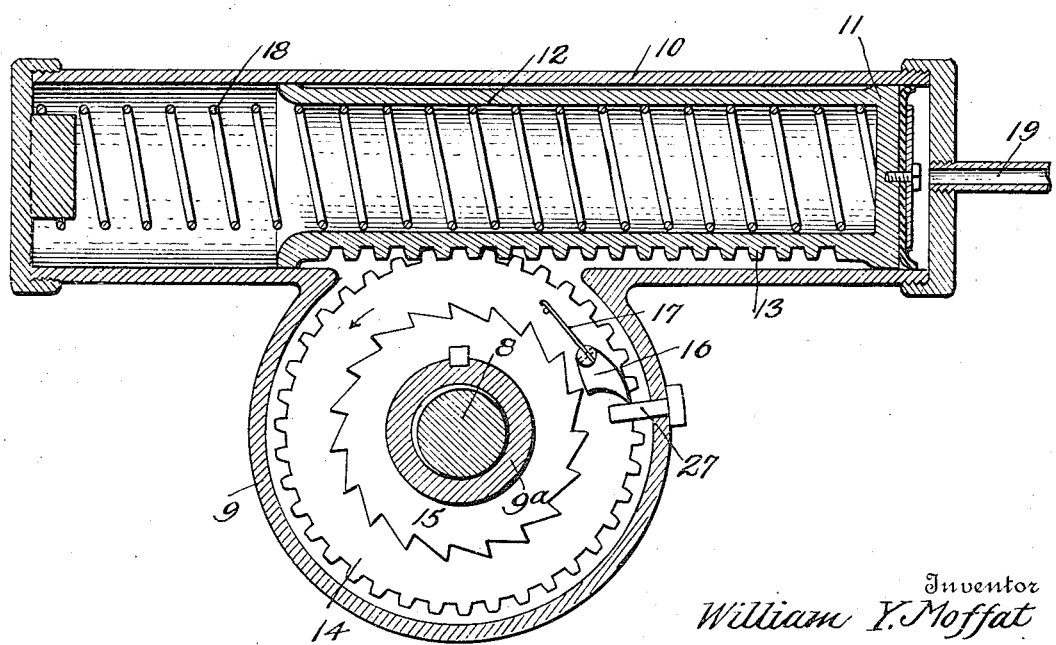

A complete understanding of the invention will be had upon reference to the following detailed description, and to the accompanying drawings, in the latter of which:

Figure 1 is a plan view of a brake system showing my slack adjusting device applied thereto, the brake cylinder and its piston being illustrated in section, and the bracket supporting the adjustable fulcrum being broken away to bring out clearly certain detail parts. Fig. 2 is a sectional view of the slack adjusting device proper. Fig. 3 is a view of a modified adaptation of the invention, and Fig. 4 is a view similar to Fig. 3, showing a further modification in respect to the use of the invention in a different type of brake system.

Throughout the following detail description and on the several figures of the drawings, similar parts are referred to by like reference characters.
Referring to Figs. 1 and 2 of the drawings particularly, 1 denotes a common brake cylinder, 2 its piston, and 3 the brake levers customarily employed in systems of this class. The levers 3 are connected by the brake rod 4, the piston 2 having a piston rod 2' operatively connected with one of the levers 3. Connecting rods 5 lead off from the levers 3 for connection with other parts of the brake system, being conventionally employed in apparatus of this type, and which parts I have not deemed it necessary to illustrate. Offstanding from one of the heads of the cylinder 1 is a supporting bracket 6 having slidably mounted therein a fulcrum block 7 to which one of the levers 3 is pivoted. An adjusting screw 8 is connected at one end to the fulcrum block 7, and the opposite end portion of said screw passes through a casing 9 which virtually consists of a hollow extension of the slack adjusting cylinder 10. Mounted to rotate in the casing 9 is a butt or sleeve $9^a$, which is swiveled or otherwise mounted on the free extremity of the bracket 6. In the cylinder 10 is arranged a sliding piston 11 which comprises a hollow body 12 provided longitudinally thereof with a rack 13, the teeth of which are milled flat to engage with corresponding teeth of a gear 14, rotary movement of the piston being thus prevented. The gear 14 is mounted in the casing 9 loose on the sleeve $9^a$, which sleeve is internally threaded for engagement with the screw 8 which passes therethrough. A ratchet wheel 15 is arranged at one side of the gear 14 and is keyed to the sleeve $9^a$ to rotate therewith. On the gear 14 is pivotally mounted a pawl 16, there being a spring 17 coöperating with the pawl to cause the latter to engage with the teeth of the ratchet wheel 15. A coiled spring 18 in the adjusting cylinder 10 bears at one end against a head of said cylinder and at its opposite end is received in the hollow body 12 of the piston 11.

Normally, the spring 18 tends to hold the piston 11 in the position shown in Fig. 2. The cylinder 10 is connected by a suitable air pipe 19 with the brake cylinder 1 and in the operation of the slack adjusting means described, assuming that there is no slack being taken in, the piston 2 moves in the cylinder 1 under the influence of the customary pressure medium without uncovering the port 19' leading into the pipe 19. Should there be slack in the brake connections, such as due ordinarily to wear on the brake shoes, it will be apparent that an abnormal movement of the piston 2 will be caused, said piston moving a sufficient distance to uncover the port 19' and permit the air admitted under pressure into the cylinder 1 to pass through the pipe 19 to the cylinder 10. When the pressure medium enters the cylinder 10, the piston 11 moves longitudinally toward the outer end of said cylinder, compressing the spring 18 and rotating the gear 14 in the direction of the arrow in Fig. 2. During said rotation of the gear 14, the pawl 16 rises over the teeth of the ratchet 15. When the brakes are released, and pressure thereby removed from the working side of the piston, the spring 18 will return said piston to its normal position, reversely rotating the gear 14 and causing the ratchet wheel 15 to rotate with said gear by reason of the engagement of the pawl 16 therewith. The last-mentioned movement of the ratchet wheel 15 causes a simultaneous movement of the threaded actuating sleeve 9ª, which in turn imparts longitudinal movement to the screw 8, drawing the fulcrum block 7 outwardly on the bracket 6, the slack in the operating connections of the brake mechanism being thus taken up.

In Fig. 3, a slightly modified adaptation of the slack adjusting cylinder and associated parts is illustrated, said parts being of the same construction as shown in Figs. 1 and 2, but differently applied to the brake mechanism. In the construction shown in Fig. 3, an operating shaft 20 is provided, the same being composed of jointed sections to afford a certain degree of flexibility. Said shaft has ratchet wheel 15 secured thereto, and the sleeve 9ª, hereinbefore described, is dispensed with. Carried by the shaft 20 is a bevel gear 21, the same meshing with the bevel gear 22 keyed or otherwise secured to a turn buckle 23. The turn buckle 23 is journaled in bearings in the sides of a U-shaped frame 24, and the intermediate portion of said frame has a bearing in the shaft 20 which passes therethrough. The brake rod 4ª in the modification connects suitable brake levers 3ª, and is made of sections, instead of being of the form shown in Fig. 1. The sections of the brake rod 4ª have adjacent threaded ends engaged by the corresponding threaded ends of the turn buckle 23. The shaft 20 extends entirely through the casing 9 of the adjusting cylinder. The principle of operation of the parts in the modified adaptation is practically the same as in relation to the construction first described, rotation of the turn buckle 23 adjusting the length of the brake rod 4ª in order to take up unnecessary slack.

In Fig. 4 a further modification is illustrated, wherein certain parts are numbered in a manner corresponding with the equivalent parts in Fig. 1. In the modification of Fig. 4, however, the adjusting screw, designated 8ª, passes through the fulcrum block 7ª, a bevel gear 25 being secured to said screw to rotate therewith. An operating shaft 26 carries a bevel gear 27' meshing with the gear 25, and said shaft 26 corresponds with the shaft 20 in Fig. 3, and is rotated direct from the ratchet wheel 15 of the adjusting mechanism.

The provision of the jointed shaft 20 in Fig. 3 is necessary because of the lateral shifting of the brake rod 4ª in the slack adjusting operation, it being necessary to have relative movement of the take-up means and the adjusting means for the purpose mentioned.

As will be seen from Fig. 2, a stop 27 is carried by the wall of the casing 9 and is arranged in the path of movement of the pawl 16. As the gear 14 is returned to its normal position after a slack adjusting operation, the pawl 16 by engagement with the stop 27, is disengaged from the ratchet wheel 15, leaving the said wheel free to be rotated independently of the automatic adjusting means described, as for instance, by hand, should it be desired to take up the slack in the connections by manual operation. In the modifications of Figs. 3 and 4, the shafts 20 and 26, respectively, would be manually operated under the conditions last referred to.

Having thus described my invention, what is claimed as new is:

1. In a slack adjuster, the combination of an adjusting cylinder, a piston mounted therein for operation by a pressure medium and comprising a hollow body provided with a rack, a gear wheel meshing with said rack, slack take-up mechanism operable by said gear wheel and normally inoperative in relation thereto, a ratchet wheel, a pawl carried by the gear wheel for coöperation with said ratchet wheel, means for supplying a pressure medium to the cylinder, a stop to engage the pawl aforesaid to render the same inoperative in relation to the ratchet wheel at a predetermined point in the movement of the piston, and a spring arranged in said cylinder and in the hollow portion of the piston, and normally tending to hold the piston in its normal position.

2. In a slack adjuster, the combination of brake mechanism, slack adjusting means therefor comprising a supporting bracket, a fulcrum block slidably mounted thereon, a screw connected with said block, a sleeve rotatable upon said bracket and having threaded engagement with the screw, means for rotating said sleeve comprising a ratchet wheel secured thereto, a gear, a ratchet pawl intermediate the gear and ratchet wheel, a slack adjusting cylinder, a piston in said cylinder having a rack engaging the gear to operate the same, means for supplying a pressure medium to the cylinder to move the piston therein, a spring to hold the said piston in its normal position, and means for rendering the ratchet pawl inoperative in relation to the wheel when the parts are in their normal positions, whereby the fulcrum block may be manually adjusted.

3. A slack adjuster comprising a slack adjusting cylinder, a piston mounted therein and provided with a longitudinal rack, means for supplying a pressure medium to said cylinder, a slack take-up device, a gear meshing with the rack aforesaid, pawl and ratchet mechanism intermediate said gear and the slack take-up device for operation of the latter, and means for normalizing the parts after operation of the same.

4. A slack adjuster comprising a slack adjusting cylinder, a piston mounted therein, a rack carried by said piston, a spring normally holding the piston in a predetermined position, means for supplying a pressure medium to the cylinder to move the piston against the action of the spring, a gear meshing with the rack, a slack take-up member, a ratchet wheel secured for rotation with said take-up member, and a pawl intermediate said gear and ratchet wheel to operate the latter when the gear is actuated by the spring.

5. A slack adjuster comprising a slack adjusting cylinder, a piston mounted therein, a rack carried by said piston, a spring normally holding the piston in a predetermined position, means for supplying a pressure medium to the cylinder to move the piston against the action of the spring, a gear meshing with the rack, a slack take-up member, a ratchet wheel secured for rotation with the take-up member, a pawl intermediate said gear and ratchet wheel to operate the latter when the gear is actuated by the spring, and a stop to engage said pawl during the normalizing movement of the parts to free the pawl from the wheel.

6. In a slack adjuster, the combination of a cylinder, a hollow piston mounted therein and provided along a side thereof with a rack, a spring partly housed in the hollow portion of said piston and bearing against the cylinder to normally hold the cylinder in a predetermined position, a gear meshing with the rack, a slack take-up member, and pawl and ratchet mechanism intermediate said gear and said take-up member.

7. In a slack adjuster, the combination of a cylinder, a hollow piston mounted therein and provided along a side thereof with a rack, a spring partly housed in the hollow portion of said piston and bearing against the cylinder to normally hold the piston in a predetermined position, a gear meshing with the rack, a slack take-up member, pawl and ratchet mechanism intermediate said gear and said take-up member, and means for rendering the pawl and ratchet mechanism inoperative.

WILLIAM Y. MOFFAT.

Witnesses:
FRANK J. JORDAN,
JOHN R. WARD.